Figure 5:
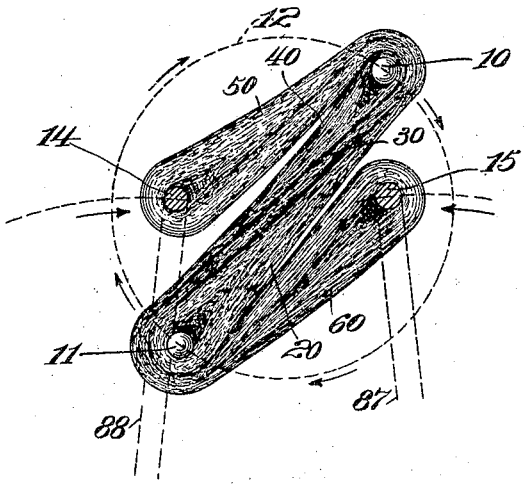

No. 790,920. PATENTED MAY 30, 1905.
F. H. RICHARDS.
PROCESS OF MAKING CANDY.
APPLICATION FILED JUNE 14, 1904.
4 SHEETS—SHEET 1.
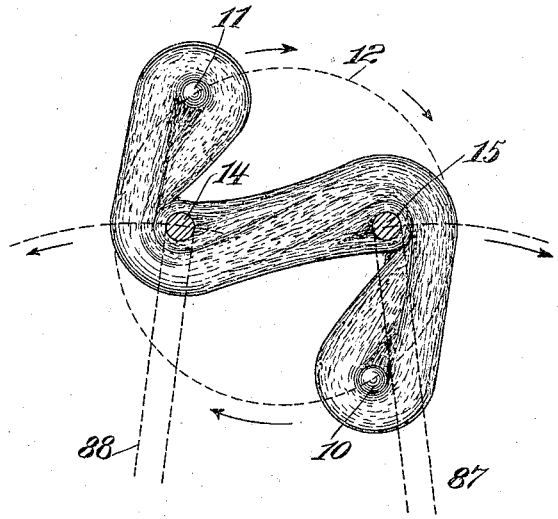
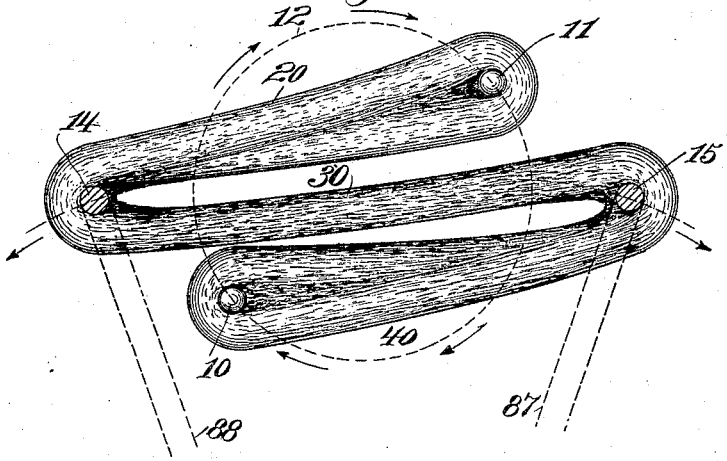
Witnesses:
F. E. Maynard.
Galderni C. Fuss.
Inventor:
F. H. Richards.

No. 790,920. PATENTED MAY 30, 1905.
F. H. RICHARDS.
PROCESS OF MAKING CANDY.
APPLICATION FILED JUNE 14, 1904.
4 SHEETS—SHEET 2.
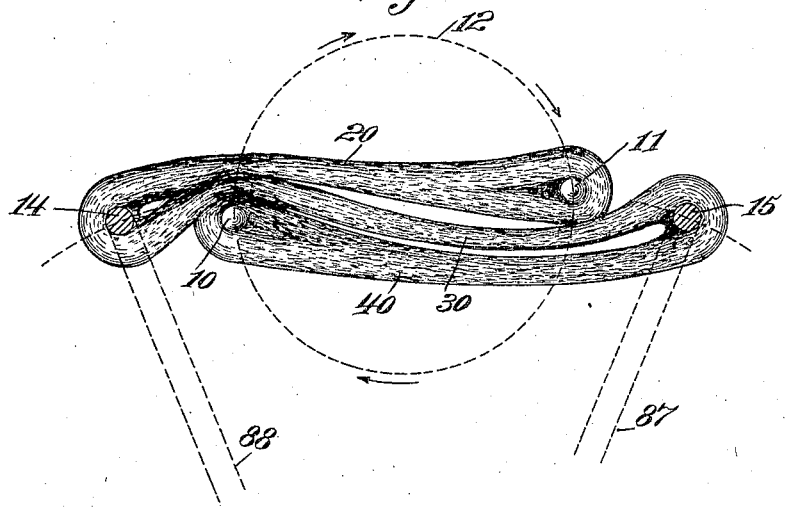
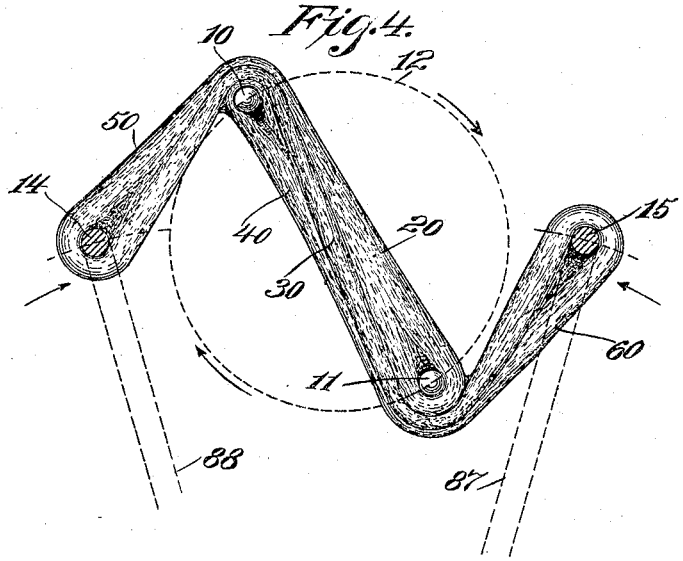
Witnesses:
F. E. Maynard.
Galderim C. Fuss.
Inventor
F. H. Richards.

No. 790,920. PATENTED MAY 30, 1905.
F. H. RICHARDS.
PROCESS OF MAKING CANDY.
APPLICATION FILED JUNE 14, 1904.

4 SHEETS—SHEET 3.

Witnesses:
F. E. Maynard.
Calderon C. Fuss.

Inventor:
F. H. Richards.

No. 790,920. PATENTED MAY 30, 1905.
F. H. RICHARDS.
PROCESS OF MAKING CANDY.
APPLICATION FILED JUNE 14, 1904.
4 SHEETS—SHEET 4.
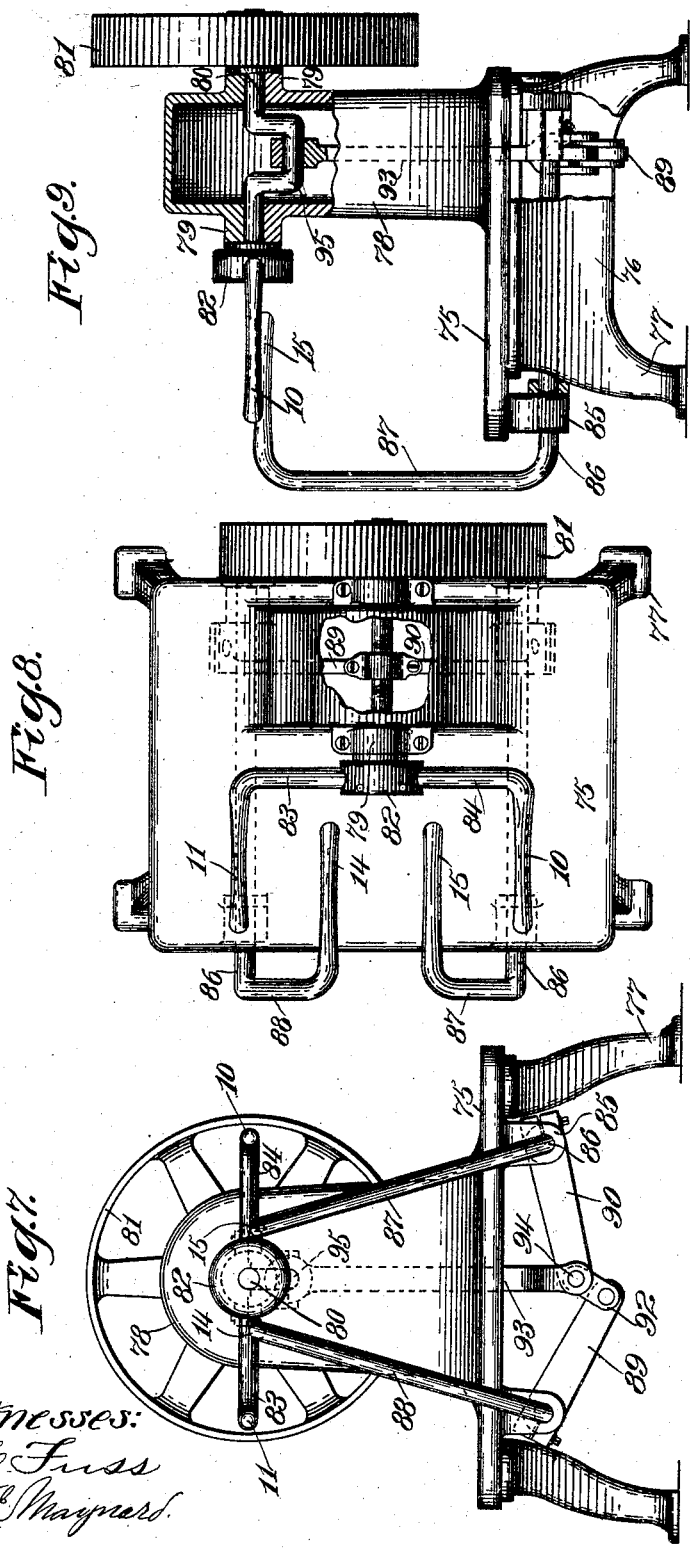
Witnesses:
C. C. Fuss
F. E. Maynard
Inventor:
F. H. Richards No. 790,920.                                                                                            Patented May 30, 1905.

UNITED STATES PATENT OFFICE.

FRANCIS H. RICHARDS, OF HARTFORD, CONNECTICUT.

PROCESS OF MAKING CANDY.

SPECIFICATION forming part of Letters Patent No. 790,920, dated May 30, 1905.

Application filed June 14, 1904. Serial No. 212,453.

*To all whom it may concern:*

Be it known that I, FRANCIS H. RICHARDS, a citizen of the United States, residing at Hartford, in the county of Hartford and State of Connecticut, have invented certain new and useful Improvements in Processes of Making Candy, of which the following is a specification.

This invention relates to and has for an object to provide an improved process of making candy, and relates more particularly to that part of the candy-making art having to do with the pulling and working of the candy. In this improved process the mass of candy is subjected to the operation of pulling in such manner as to draw the mass out into a plurality of strands, which are then lapped upon each other, and the ends of the mass so formed are folded over onto and just beyond the middle portion of the mass, which at the middle part thereof is then kneaded together, thereby to firmly unite or bond the strands into a relatively solid mass, whereupon the drawing and lapping operations are repeated as before. This novel feature or process results in favorably modifying the drawing operations, since the kneading together of the lapped strands so changes these as to secure a high degree of integrality in the mass, considered as a whole, with the result that when the pulling operations are repeated the flowage of the candy in the mass is controlled and modified and the efficiency of the operations materially improved.

In the drawings accompanying and forming a part of this specification the working of the process is illustrated, as is also a machine which is capable of use in carrying out such process.

Sheets 1, 2, and 3 of the drawings illustrate the various steps in the working of the process, in which sheets Figures 1 to 6 are included and each of which figures shows one-sixth of an angular advance in a circle of movements beyond that shown in the preceding view.

Figure 6:
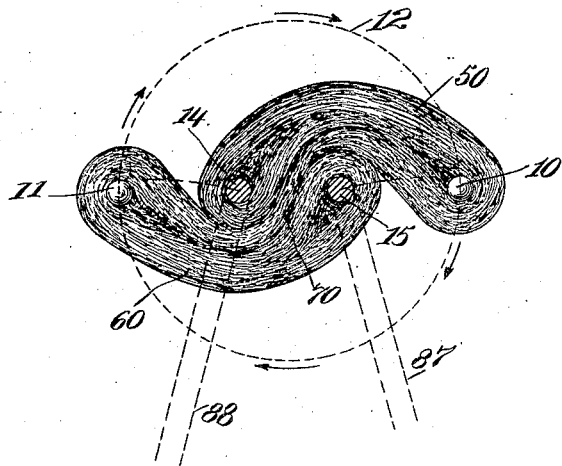

Each of the steps which each figure of the drawings above referred to illustrates may, as a brief preface to the detailed description which is to follow, be stated. Fig. 1 shows the commencement of the drawing out of the kneaded mass. Fig. 2 shows pulling out three long drafts; Fig. 3, making three long laps of such drafts; Fig. 4, pulling the ends into two short supplemental drafts; Fig. 5, lapping down the two short drafts, making five strands in the center. Fig. 6 shows kneading the central mass to consolidate the five strands or laps. Fig. 7 is an end elevation of a form of machine which may be used in carrying out the process. Fig. 8 is a plan view thereof, partly broken away to reveal certain of the working mechanism; and Fig. 9 is a side elevation, partly in central section, also partly broken away for a similar purpose.

In describing the process or method involved in the present invention the figures of the drawings will be found useful, and for the present it will be assumed that the pulling-arms are operated in some manner similar to that shown in Sheet 4 of the drawings. There are illustrated a pair of pulling-arms 10 and 11, respectively, which arms are adapted to revolve in a circular orbit, (illustrated by dotted lines 12 and moving in the direction of of the arrows placed adjacent thereto,) and these arms in the present description may for brevity be called the "revoluble" arms. There are also shown a pair of pulling-arms 14 and 15, which are adapted to reciprocate toward and from each other. In the present illustration the arms travel upon arcs of circles, they being mounted upon suitable oscillatory arms or levers in the mechanism shown in Figs. 7 to 9. Such arms are adapted to move toward and from each other in unison and toward and from the center of the orbit 12. The path of movement of such arms passes within and without the orbit of revolution of the revoluble arms, and assuming that the arms 14 and 15 are so related by the mechanical connections with the means for revolving the other arms that they will each approach and recede from said orbital axis once during each revolution then each of the reciprocatory arms will in traversing its path of reciprocation intercept the path of movement of each of the revoluble arms once, moving across the path of one arm toward the center of the orbit thereof and once across the path of the other arm, moving outwardly from such center, and one of the arms, as 10, will always pass inside of the arm 14 and outside of the arm 15, and the arm 11 will always pass inside of the arm 15 or between it and the axis of said orbit and will pass outside of the arm 14.

The arms above alluded to are useful in performing one of the features of this invention, which consists in so moving the various portions of the mass of candy that two portions are each moved in a continuous substantially circular path, and at the same time two other portions are each moved simultaneously in a different path, whereby each of the latter portions will intersect and be intersected by the portions traversing the circular paths. Moving the portions in different paths will pull the intermediate portions and will then bring the pulled portions together, and the movement of some of the portions may be such that the consolidated pulled portions will be pressed together by the application of pressure positively to both sides thereof. By "positive" pressure is meant pressure brought to bear upon the mass of candy between two opposing forces moving relatively toward each other in contradistinction from the pressure which would exist by pushing a mass of candy against a stretched-out portion of candy having no support to react against such pressure.

It will be assumed that the mass of candy represented in the illustration in the various steps of being pulled has been worked sufficient to get it in proper position upon the various pulling-arms, this of course being dependent upon the consistency of the candy by reason of the condition of the temperature, of the atmosphere, &c., and this mass is shown in Fig. 3 after having been pulled out into three long drafts (designated, respectively, 20, 30, and 40) and such drafts being lapped or folded together into three long laps. It will be observed that in this view the distance between the centers of the arms 11 and 15 and the arms 10 and 14 is considerably less than the distance between the arms 10 and 11, whereby in folding the candy into the long laps the revoluble arms lay their loads together as near the reciprocatable arms as practicable in an even working of the device and in such a manner that practically the entire mass of candy is folded upon itself in three long laps. In Fig. 4 the revoluble arms have advanced angularly about sixty degrees and the reciprocatable arms have moved toward the axis of the said orbit, whereby nearly the entire mass which comprised the strands 20, 30, and 40 is located between and carried by the revoluble arms, and there are drawn out strands 50 and 60 partly from such mass, but principally from the portions not entering into the three-lapped mass, the strand 50 being drawn between the arms 14 and 10 and the strand 60 between the arms 15 and 11, and during such drawing the said strands or drafts are being brought toward the mass made by the previous folding, and, as illustrated in Fig. 5, the short drafts 50 and 60 are about in position to be folded upon the mass of the former folding, and upon continued movement the short drafts are folded upon the mass, thus making a mass having five drafts lapped together, and, again, it will be noticed that at the period of lapping (see Fig. 5) the distance between centers of the arms 10 and 15 and 11 and 14 is considerably less than the distance between the arms 10 and 11, whereby again the lapping of the mass is so performed that the ends of the strands 50 and 60 will be laid over comparatively the entire area of the central mass upon which they are lapped. Thus it will be seen that each time the candy is lapped first into the long-lapped mass and then in the short-lapped mass the ends which are folded over the central portion are lapped nearly to the extremities of such central portion. Thus the entire mass is folded upon itself twice during each cycle. In Fig. 6 the reciprocatory arms have more nearly approached the axis of the orbit and the orbital arms have moved angularly about sixty degrees from the position shown in Fig. 5 and during which time substantially the entire mass of candy embodying the five-lapped portion 70 has been kneaded together between the reciprocatory arms, which after they advance toward each other fold the end portions of the mass past each other over the middle portion of the mass, then directly knead or press the whole mass together in the middle portion thereof, thereby firmly incorporating the strands together, and so preparing the mass for a repetition of the complete operation. The kneading occurs at a time when comparatively little pulling action is taking place, after which kneading the inauguration of the three long drafts will take place, as seen in Fig. 1, which figure illustrates an angular advance of sixty degrees over Fig. 6. The completion of the three long drafts is shown in Fig. 2, which again is an advance of sixty degrees angularly. The three long drafts there illustrated are lapped together upon an angular advance of sixty degrees, as shown in Fig. 3, thus making a complete cycle and occupying a period of a complete revolution of each of the arms 10 and 11 and a complete reciprocation of each of the arms 14 and 15.

During the kneading the outer portions of the drafts last lapped upon the mass—as, for instance, in Fig. 6, the ends of the drafts 50 and 60 adjacent to the arms 10 and 11, respectively—are partly wrapped about the mass being kneaded, and the mass of candy while being subjected to the kneading action is, due to such wrapping, also worked. The candy from the commencement of the operation to its completion may be kept in a state of continuous unrest.

The machine shown may conveniently be employed in carrying out this process, although it is merely herein shown as a suggestion and to illustrate some of the diagrammatic representations in the other views, the frame of which machine comprises a bed-plate 75, supported upon a base 76, having some suitable feet 77. The bed-plate carries a standard 78 in the form of a housing, which housing has at oppositely-disposed sides hubs 79, which constitute bearings for the driving-shaft (designated by 80) and which shaft carries a pulley 81, which may be driven by a belt from some suitable source of power. (Not shown.) The driving-shaft has a hub 82 fast upon it, from which hub radially project a pair of arms 83 84, one of which carries the arm 10, and the other of which carries the arm 11, these latter being the revoluble pulling-arms heretofore alluded to.

Dependent from the bed-plate are suitable hangers 85, which support shafts 86, carrying, respectively, arms or levers 87 88, one of which carries one of the arms 14 and the other the arm 15, heretofore alluded to as the "reciprocatory pulling-arms." The shafts 86 may be respectively provided with crank or rocker arms 89 90, which cranks may be connected together by a link 92, which may be connected by a link 93, at the present instance connected to the pivot 94, which unites the link 92 to the crank 90 and is also connected to a crank 95 of the driving-shaft, an eye on the link 93 surrounding such driving-shaft where forming the crank 95, whereby the recriprocatory arms will be moved in unison with the revoluble arms.

Having thus described my invention, I claim—

1. The process of pulling candy which consists in pulling the candy into three long drafts, then folding it in three long laps, then pulling two short drafts, then folding the short drafts upon the previously-folded mass, and then kneading the lapped mass just prior to the repetition of the first-mentioned step.

2. The process of pulling candy which consists of pulling the candy into three long drafts, one of which is longer than the others, then lapping the shorter drafts upon the respective sides of the longer draft, and leaving the end overhang the mass, then pulling the overhanging portion into short drafts, and then folding the short drafts upon the respective sides of the previously-folded mass, and then kneading the mass.

3. The art of pulling candy which consists of repeatedly pulling a mass into three drafts, lapping the drafts together, leaving two ends protruding from the lapped mass, pulling the said ends and folding the same upon the previously-lapped mass.

4. The art of pulling candy which consists of repeatedly pulling a mass into three drafts, lapping the drafts together, leaving two ends protruding from the lapped mass, pulling the said ends and folding the same upon the previously-lapped mass, and then kneading the whole.

5. The art which consists of working a mass of candy into a plurality of laps by repeated pullings and foldings, the folding and pulling proceeding by an alternation of a number of long and a number of short drafts.

6. The art of making candy which consists of pulling the mass of candy into long drafts, lapping the drafts together, then pulling two short drafts from the lapped mass and folding the short drafts upon the respective sides of the previously-folded mass, leaving the ends of the draft overhang the mass, then kneading the lapped mass and wrapping the overhanging portions about the mass being kneaded and thereby working the same during the kneading.

7. The method of making candy which consists in moving two portions of the mass of candy each in a continuous circular path, and simultaneously moving two other portions each in a different path alternately intersecting and being intersected by the portions traversing the circular paths.

8. The method of making candy which consists in moving one portion of a mass of candy in a continuous path, simultaneously moving another portion in a different path to pull an intermediate portion, then bringing together the pulled portions, and then consolidating the said portions by the application of pressure to both sides thereof.

9. The art of making candy which consists of repeatedly forming the mass of candy into a plurality of folded laps and kneading the folded mass after each such formation by pressure applied upon its opposite sides.

10. The art of making candy which consists of repeatedly drawing and lapping a mass of candy into a plurality of drafts folded together, and after each such folding positively pressing the same from opposite sides to bring the several portions of the said folded mass into intimate union.

11. In the art of making candy which consists in pulling the candy into drafts, lapping the drafts into a mass, leaving the ends of the drafts overhang the lapped mass, then applying positive pressure to both sides of the mass to knead the same and wrapping the overhanging ends about the mass while the same is being kneaded and thereby working the same.

Signed at Nos. 9 to 15 Murray street, New York, N. Y., this 13th day of June, 1904.

FRANCIS H. RICHARDS.

Witnesses:
FRED. J. DOLE,
CHAS. LYON RUSSELL.